July 28, 1931.　　　G. H. FORSYTH　　　1,816,643
DISK WHEEL
Filed May 18, 1922
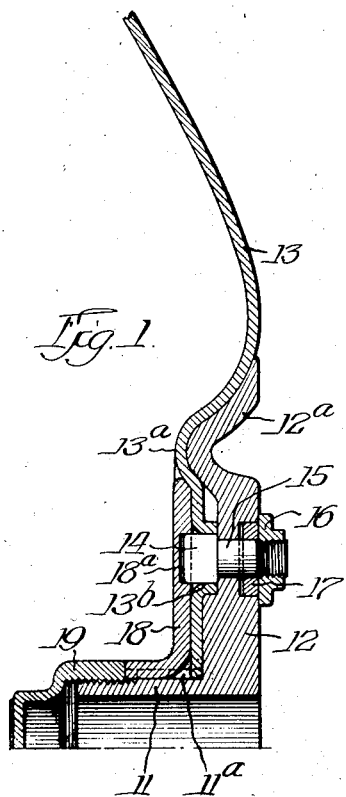
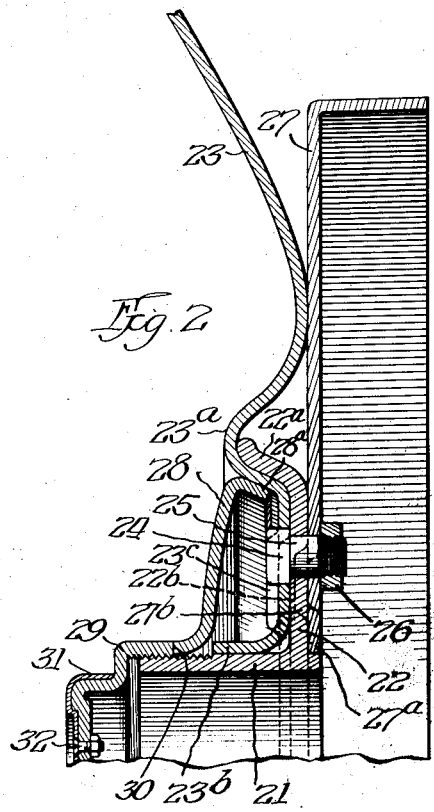

Patented July 28, 1931

1,816,643

UNITED STATES PATENT OFFICE

GEORGE H. FORSYTH, OF CHICAGO, ILLINOIS, ASSIGNOR, BY MESNE ASSIGNMENTS, TO STEEL WHEEL CORPORATION, OF LANSING, MICHIGAN, A CORPORATION OF MICHIGAN

DISK WHEEL

Application filed May 18, 1922. Serial No. 561,804.

This invention has for its object, primarily, the provision of a simple, efficient, thoroughly mechanical assembly of the wheel body, preferably, though not necessarily a disk, at the wheel center with the hub and concomitant parts such as the hub plates, brake drum, etc.

The invention in its ultimate embodiment provides for ready demounting of the wheel from the hub, avoids the breaking of the wheel surface by such elements as bolt-engaging nuts, guards against shearing of the driving connections, insures the maintenance of an intimate relation of the parts when assembled, imparts a mutual supporting cooperation between the several parts thus preventing any development of lost motion, and provides a substantially unbroken front face to the wheel in the hub zone and adjacent thereto resulting in an improved appearance and the minimizing of opportunity for the lodgement of dirt, the entrance of the elements and the attack of rust.

Other inherent advantages of the invention will be made apparent to persons skilled in the art from the following written disclosure predicated upon the accompanying drawing, wherein Figs. 1, 2, 3 and 4 are fragmentary radial sections taken through different embodiments of the invention by way of exemplification.

As obviously the wheel structure is susceptible of further modification without departure from the essence of the invention and the sacrifice of its advantages to a material extent, the drawings and description are to be taken in an illustrative and not in an unnecessarily limiting sense.

In Fig. 1 of the drawings the hub, indicated at 11, is shown as provided with a fixed hub plate or flange 12 shown as being formed integral therewith, although obviously the hub plate instead of being integral may be fixedly associated therewith against relative rotation. The disk body 13 of the wheel is shown as forwardly concave outwardly beyond the hub zone and as rearwardly supported both laterally and radially in its deepest portion by the extension 12ª of the fixed hub plate 12. At the point 13ª the disk is forwardly shouldered and inwardly thereof extends in a substantially radial direction being provided at intervals annularly with flanged apertures 13ᵇ to accommodate the heads 14 of bolts 15 fixedly associated with the hub plate 12, the plate being clamped between the shoulders formed by the heads and the nuts 16. To assist in sustaining the shear strains a bushing or collar 17 is disposed about each of the bolts 15 adjacent the nut 16.

It will be observed that the disk body of the wheel is angularly interlocked with the fixed hub plate by means of the bolt heads 14 received within the apertures 13ᵇ of the disk while disengagement or separation in an axial direction is provided for by merely sliding the disk off the bolt heads. Additional provision is made against angular displacement while providing for axial separation in that the center of the disk is marginally notched for engagement with a key-way 11ª of the hub.

The disk body is held in assembled relation with the hub while in use and the interlocking bolts concealed by a removable hub or cover plate 18, centrally grooved for engagement with the key 11ª, and bearing against the forward face of the disk, its periphery preferably underlying the disk shoulder 13ª so as to provide a substantially flush surface, the removable plate itself being received within the central concavity of the wheel body bounded by the shoulder 13ª. Advantageously the removable hub or cover plate 18 is provided on its bearing face with recesses 18ª which receive and form an interlock with the bolt heads 14 which are concealed by said plate.

The removable hub plate 18 is, in this figure, shown as positioned and held in lateral bearing relation to the wheel body and fixed hub plate by means of a hub cap 19 threaded upon the forward end of the hub.

In Fig. 2 the hub 21 is provided with a fixed hub plate 22 having its periphery extending forwardly as indicated at 22ª into an annular recess formed by the forward shoulder 23ª of the disk 23. Herein the central portion of the disk body is forwardly flanged at 23ᵇ and bears inwardly directly upon the hub. As in the former instance the wheel body is apertured at intervals annularly to receive the heads 24 of bolts 25, the shanks of which extend through the fixed hub plate 22 and which bolts by means of the nuts 26 serve to clamp the brake drum 27 to the fixed hub plate 22, providing an interlocking driving connection which may be supplemented by notching the brake drum at 27ª for engagement with a correspondingly notched portion of the hub.

To provide angular interlock between the fixed hub plate, the wheel body and brake drum, supplemental to the bolts 25 and the head 24ª, provision is made for an interlock between integral portions of the wheel body and fixed plate and brake drum by shear-pressing these members as indicated at 23ᶜ, 22ᵇ, and 27ᵇ, the metal being sheared along approximately radial lines and then pressed laterally beyond the plane of the member, these integral portions projecting from the face of one member being received within the resulting recesses in the adjacent member.

In this figure the removable hub or cover plate 28 is shown as arched in diametric section and provided with a peripheral rearwardly and inwardly extending flange 28ª, which flange is received within the concavity of the disk body bounded by the shoulder 23ª and underlies said shouldered portion to form a lateral and radial support for the disk.

This removable hub plate 28 is shown as having no angular interlock with the hub, as was the case in Fig. 1, but it is rotatable thereon and may be formed integral with the hub cap 29 or separated therefrom along the line indicated at 30 as may be desired.

Herein the hub cap, to prevent marring of the paint when a wrench is applied thereto, is shown as covered with a shell 31 of non-corrosive metal attached thereto by the screw 32.

In Fig. 3 the hub 33 has its fixed plate 34 disposed within the brake drum 35, the said hub plate 34, the brake drum 35 and the disk body 36 being interlocked against angular rotation by means of shear-pressed formations 36ª and 35ª in the disk and brake drum, respectively, as in Fig. 2, while the fixed hub plate 34 is radially ribbed at 34ª for interlocking in a corresponding recess formed by shear-pressing the brake drum 35.

The removable hub or cover plate 37, which may be integral with the hub cap 38 or divided therefrom along the line 39, is of substantially the same construction as that shown in Fig. 2, having a rearwardly and inwardly extending peripheral flange 40 disposed within and underlying the disk inwardly of the shoulder 36ª. The forward end of the hub cap is shown as provided with an interior wrench socket 41.

In Fig. 4 is illustrated, in a very simple form of construction, the cooperative relation between the disk shoulder 42 and a removable hub plate 43 clamped upon the fixed hub plate or brake drum 44 by means of bolts 45 transfixing a filler ring 46. Here it will be observed that, apart from the more refined hub assembly details shown in the other figures, the shoulder 42 overlies the periphery of the removable hub plate 43 so as to provide a substantially flush face and shed water flowing down the face of the wheel.

By the invention as set forth hereinbefore, it will be observed that a wheel hub assembly is provided wherein the driving connections between the hub and wheel are concealed from view, the wheel face is relieved from any obstructions to its general contour which serve to accumulate dirt and encourage rust, the demounting of the wheel from the hub when desired is greatly facilitated, it only being necessary to unscrew the hub cap when the removable hub plate may be separated therefrom. The front hub plate being removed, the wheel body may be slipped in an axial direction off the interlocking bolts or interlocking integral portions of the rear hub plate and disk. By the employment in the assembly of a removable hub plate underlying a shouldered portion of the wheel and bearing rearwardly and radially thereagainst, insuring a close fit of the parts when removed and reinforcing the wheel against inwardly directed radial stresses, the invention provides a wheel which is not only of decidedly pleasing appearance but also one having the greatest efficiency when assembled and in use and most readily disassembled when required.

As contributing to the results generally stated hereinabove, it is to be noted that the central portion of the wheel disk within the hub zone, shown as disposed in a plane parallel to the plane of the wheel, is advantageously at a slight inclination thereto when disassembled, being inclined towards the rear. This counteracts any tendency of the central portion of the disk to spring towards the front out of engagement or away from a snug fit with the interlocking portions of the contiguous members. As a further precaution against disassociation of the interlock the portion 23ᵇ of the disk shown in Fig. 2 as forwardly turned parallel to the axle, has its forward edge terminated immediately adjacent the rear of the removable hub plate 28, thus preventing a movement of the hub disk free of the interlock.

Furthermore, the arched contour and the resilient character of the removable hub plate, as found in Figs. 2 and 3, cooperates with the engagement of its periphery beneath the shoulder of the disk, in such manner that the force applied laterally to said plate reacts at an inclination radially and rearwardly upon the disk, with the two-fold result that the plate applies stress radially outward to the disk and supports the radial thrust inwardly while, on the other hand, the load thrust reacts inwardly and forwardly upon the hub plate to give a "back-kick" nut locking function thereto, thus overcoming any tendency of the threaded hub cap to loosen.

I claim:

1. In combination, an axle, a hub fitted thereon, a brake drum on said hub, said drum provided on the outer axial face thereof with a circumferentially extending series of indentations, a wheel body comprising a disk coaxially arranged on said hub, said body being indented to provide lugs adapted to seat in the indentations in said drum, a disk fitted on said hub and a cap secured on the hub to clamp the wheel body against said drum.

2. In a wheel, an axle, a hub keyed thereon, a brake drum on said hub, said drum provided on the outer axial face thereof with a circumferentially extending series of indentations, a wheel body comprising a dished disk coaxially arranged on the said hub, with its convex side presented outwardly, said disk being indented to provide lugs adapted to seat in the indentations in said drum a disk fitted on said hub and a cap secured on the hub to clamp the wheel body against said drum.

3. In a wheel of the class described, in combination, an axle, an exteriorly threaded hub fitted thereon, a brake drum on said hub, said drum provided on the outer axial face thereof with a circumferentially extending series of indentations, a wheel body comprising a concavo-convex disk having a centrally arranged aperture adapted to receive said hub, said body mounted on said hub with its convex side presented outwardly, indentations in said body arranged to provide lugs adapted to seat in the indentations in said drum, a plate having a centrally positioned aperture adapted to receive the outwardly projecting end of said hub, said plate fitted on said hub and covering said indentations in said body and a cap threaded on said hub so as to bear against said plate and clamp the wheel body against said brake drum.

4. In a wheel of the class described, a hub, a brake drum on said hub, a concavo-convex disk mounted on said hub and positioned against said brake drum, inwardly projecting lugs on said disk, said brake drum provided with recesses adapted to receive said lugs, a plate having a centrally positioned aperture, said plate mounted on the outwardly projecting end of said hub, a cap threaded on said hub, said cap bearing against said plate to hold said disk in an operative position against said brake drum.

In witness whereof I have hereunto subscribed my name.

GEORGE H. FORSYTH.